US011898730B2

(12) United States Patent
Sinphay et al.

(10) Patent No.: US 11,898,730 B2
(45) Date of Patent: Feb. 13, 2024

(54) SLOPED CEILING ADJUSTABLE LIGHT FIXTURE

(71) Applicant: Hubbell Incorporated, Shelton, CT (US)

(72) Inventors: Anthony Phonexay Sinphay, Simpsonville, SC (US); Dhavalkumar Prabhudas Patel, Greer, SC (US)

(73) Assignee: Progress Lighting, LLC, Greenville, SC (US)

( * ) Notice: Subject to any disclaimer, the term of this patent is extended or adjusted under 35 U.S.C. 154(b) by 0 days.

(21) Appl. No.: 17/899,114

(22) Filed: Aug. 30, 2022

(65) Prior Publication Data

US 2023/0068837 A1 Mar. 2, 2023

Related U.S. Application Data

(60) Provisional application No. 63/239,113, filed on Aug. 31, 2021.

(51) Int. Cl.
*F21V 21/30* (2006.01)
*F21S 8/02* (2006.01)
*F21V 21/03* (2006.01)

(52) U.S. Cl.
CPC .............. *F21V 21/30* (2013.01); *F21S 8/026* (2013.01); *F21V 21/03* (2013.01)

(58) Field of Classification Search
CPC ........... F21V 21/30; F21V 21/03; F21S 8/026
See application file for complete search history.

(56) References Cited

U.S. PATENT DOCUMENTS

| | | | | | |
|---|---|---|---|---|---|
| 31,278 | A * | 1/1861 | Yale | | |
| 3,974,371 | A | 8/1976 | Miles, Jr. | | |
| 4,232,361 | A | 11/1980 | Kelsall | | |
| 7,559,677 | B1 * | 7/2009 | Dupre | F21V 21/30 | 362/372 |
| 10,731,830 | B2 * | 8/2020 | Feit | F21V 21/04 | |
| 2003/0161153 | A1 | 8/2003 | Patti | | |
| 2008/0186717 | A1 * | 8/2008 | Ruberg | F21S 8/022 | 362/365 |
| 2020/0116340 | A1 | 4/2020 | Nikooyan et al. | | |
| 2021/0116111 | A1 * | 4/2021 | Wang | F21S 8/026 | |
| 2021/0356105 | A1 * | 11/2021 | Sinphay | F21S 8/026 | |
| 2021/0364125 | A1 * | 11/2021 | Lucas | F16M 13/022 | |
| 2022/0034495 | A1 * | 2/2022 | Chen | F21V 31/005 | |
| 2022/0243903 | A1 * | 8/2022 | Chen | F21V 23/002 | |

OTHER PUBLICATIONS

PCT/US2022/042083 International Search Report and Written Opinion dated Nov. 29, 2022.

* cited by examiner

*Primary Examiner* — Christopher E Dunay
(74) *Attorney, Agent, or Firm* — Robinson + Cole LLP

(57) ABSTRACT

An adjustable light fixture includes a frame configured to rotatably connect to a support and rotate about a first axis. A lamp assembly is connected to the frame. The lamp assembly includes a housing defining a cavity. A light emitter is supported in the cavity. A lens is connected to the housing. A pivot assembly rotatably couples the lamp assembly to the frame about a second axis offset from the first axis.

20 Claims, 12 Drawing Sheets

SLOPED CEILING ADJUSTABLE LIGHT FIXTURE

RELATED APPLICATION(S)

This application is based on U.S. Provisional Application Ser. No. 63/239,113, filed Aug. 31, 2021, the disclosure of which is incorporated herein by reference in its entirety and to which priority is claimed.

FIELD

Various aspects relate to an adjustable light fixture, for example, an adjustable light for sloped ceiling applications.

BACKGROUND

Ceiling mounted lighting fixtures, such as recessed lights or downlights, are popular in homes and businesses. These types of light fixtures can meet a wide range of functional interior lighting requirements and are also aesthetically pleasing.

In most applications, it is typically desirable to have the lamp of a recessed lighting fixture arranged substantially perpendicular to the floor, whether it is installed in a horizontal ceiling or a sloped ceiling. Accordingly, the most common recessed lighting fixtures are typically constructed for a particular ceiling slope, e.g., angle, so that the lamp is arranged substantially perpendicular to the floor.

SUMMARY

According to certain configurations, an adjustable light fixture includes a frame configured to rotatably connect to a support and rotate about a first axis. A lamp assembly is connected to the frame. The lamp assembly includes a housing defining a cavity. A light emitter is supported in the cavity. A lens is connected to the housing. A pivot assembly rotatably couples the lamp assembly to the frame about a second axis offset from the first axis. The pivot assembly includes a pivot bolt and the housing is keyed to the pivot bolt.

According to certain configurations, an adjustable light fixture includes a mounting bracket configured to connect to a support for rotation about a first axis. A frame is connected to the mounting bracket and rotatable with the mounting bracket about the first axis. A lamp assembly is connected to the frame. The lamp assembly includes a housing defining a cavity. A light emitter is supported in the cavity. A lens is connected to the housing. A pivot assembly rotatably couples the lamp assembly to the frame about a second axis offset from the first axis.

According to certain configurations, an adjustable light fixture includes a frame configured to be positioned adjacent an opening in a support. The opening defining a first axis extending through the opening. A lamp assembly is connected to the frame. The lamp assembly includes a housing, a light emitter connected to the housing, and a lens connected to the housing. A pivot assembly rotatably connects the lamp assembly to the frame for rotation about a second axis offset from the first axis. The pivot assembly includes an indicator and a pivot fastener.

BRIEF DESCRIPTION OF THE DRAWINGS

The aspects and features of various exemplary embodiments will be more apparent from the description of those exemplary embodiments taken with reference to the accompanying drawings.

DETAILED DESCRIPTION OF EXEMPLARY EMBODIMENTS

Figure 1:
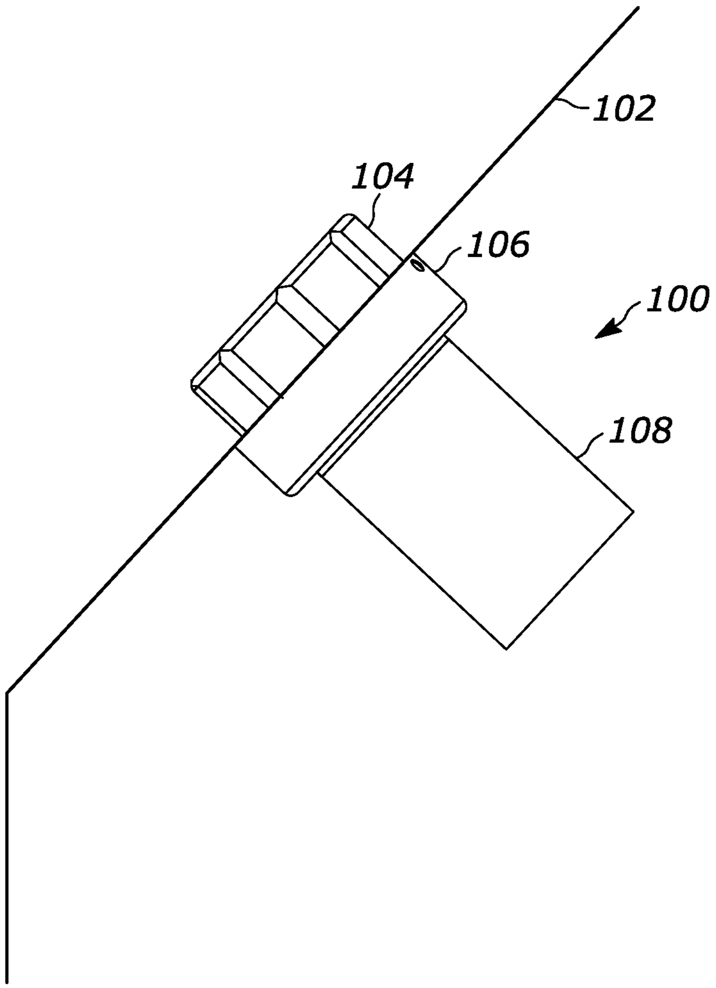
FIG. 1 is a side view of an exemplary light fixture positioned in a sloped ceiling.

FIG. 1 shows an exemplary embodiment of a light fixture 100 positioned in a support surface 102, such as a ceiling. The light fixture 100 is positioned on a first side of the support surface 102 and is connected to a junction box 104 that extends from a second side of the support surface 102. The junction box 104 can be positioned entirely or partially on the second side of the support surface 102. The junction box 104 can be any standard size and configuration. The support surface 102 is shown as a sloped ceiling that extends at an oblique angle (e.g., an acute angle) to a lighted area (e.g., a room). The light fixture 100 includes a frame 106 and an adjustable lamp assembly 108 that allows light to be directed at different angles relative to the frame 106 and therefore relative to the support surface 102. For example, the lamp assembly 108 can be adjusted so that it emits light perpendicularly into the lighted area. The position of the frame 106 and the lamp assembly 108 can be adjusted to accommodate different angle slopes in the support surface 102. Although designed for sloped ceiling applications, the light fixture 100 can be used in any sloped and non-sloped support surface (e.g., walls, floors, etc.) where directional light is desired.

Figure 2:
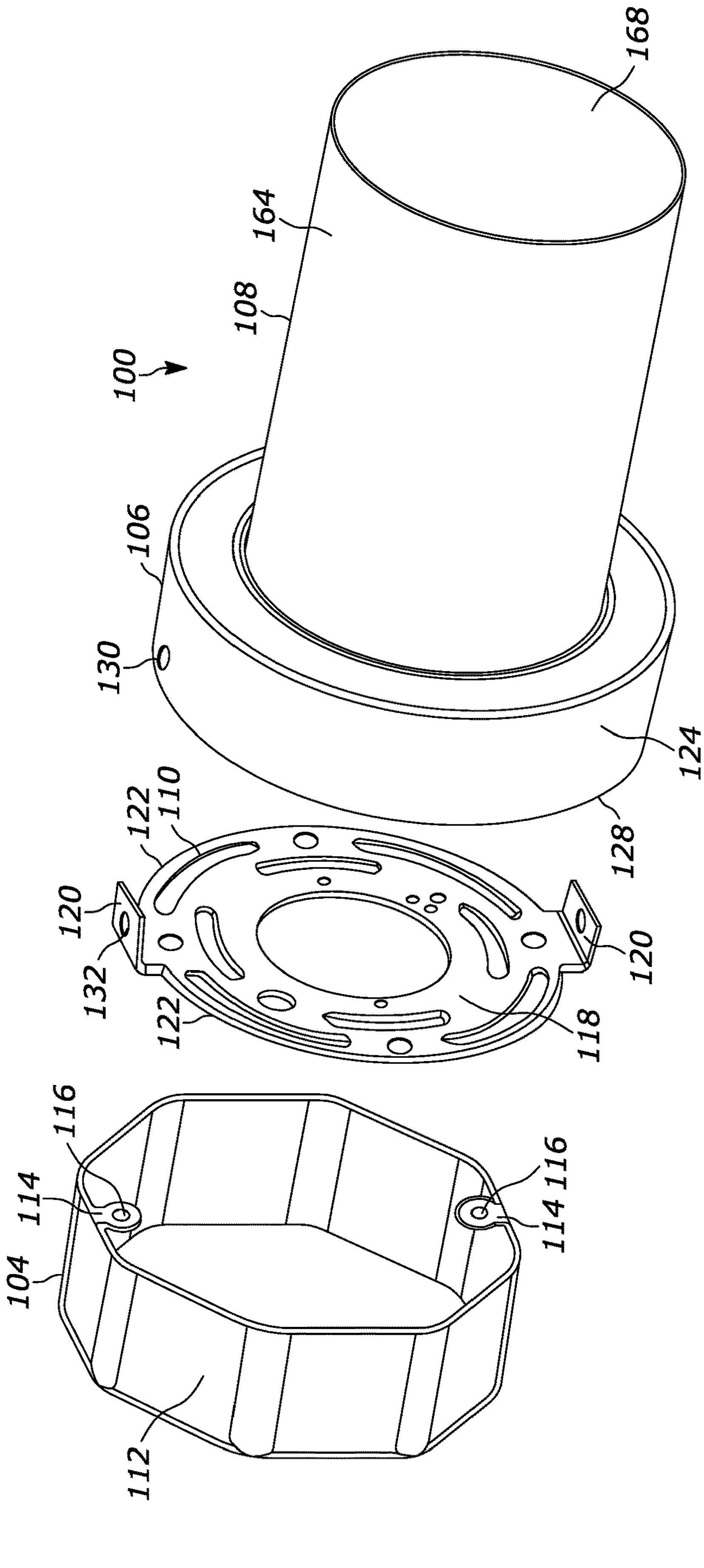
FIG. 2 is a partial exploded view of the light fixture of FIG. 1.
Figure 3:
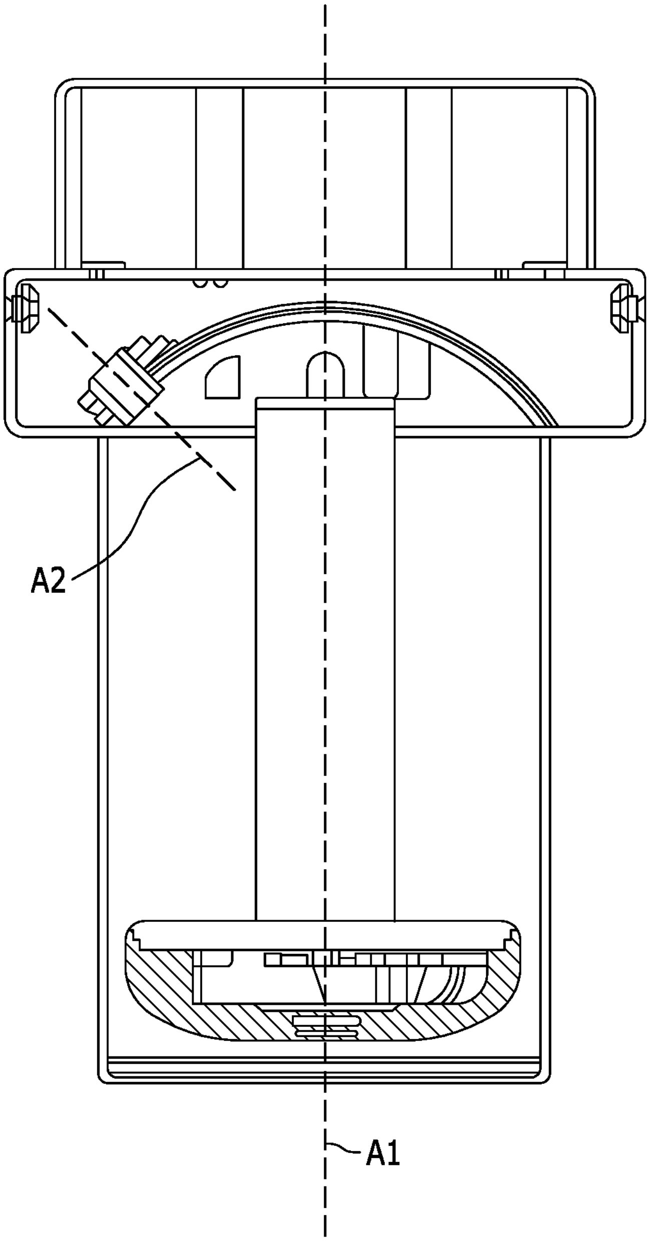
FIG. 3 is a sectional view of the light fixture of FIG. 1.

FIGS. 1-3 show an example of the junction box 104 and the light fixture 100. The light fixture 100 includes the frame 106 and the lamp assembly 108. A mounting bracket 110 connects the light fixture 100 to the junction box 104. The mounting bracket 110 can be included with the light fixture 100, included with the junction box 104, or be provided as a separate element. In the illustrated embodiment, the junction box 104 has an outer wall 112 and one or more flanges 114 extending from the outer wall 112 toward the interior of the junction box 104. The flanges 114 can include openings 116 that are configured to receive a fastener. An electrical connection (not shown) can be made inside of the junction box 104 to connect the lamp assembly 108 to a power supply, for example a mains power supply.

In some configurations, the mounting bracket 110 includes a body having a main plate 118 and a pair of side flanges 120 extending away from the main plate 118, as best shown in FIGS. 2 and 3. Arcuate slots 122 are formed in the main plate 118. The arcuate slots 122 are configured to align with the openings 116 in the junction box flanges 114 and receive a fastener to connect the mounting bracket 110 to the junction box 104. In other embodiments, the mounting bracket 110 may be connected to the junction box 104 through openings in the main plate 118 which are configured to align with the openings 116 in the junction box flanges 114. The frame 106 is then releasably connected to the bracket 110, as will be described in more detail below.

The elongate slots 122 form a moveable connection between the junction box 104 and the mounting bracket 110, and thus the frame 106. Through this connection, the frame 106 is rotatable relative to the junction box 104 about a first axis A1 (FIG. 3). In the illustrated embodiment, the main plate 118 includes four arcuate slots 122 equally circumferentially spaced. Each arcuate slot 122 extends approximately 60 degrees around the first axis A1. Other angles between 0 and 90 degrees may be used. For example, in certain configurations each arcuate slot 122 may extend between approximately 30 and 70 degrees. In other configurations, in certain configurations each arcuate slot 122 may extend at least 30 degrees. Other sizes and arrangement of slots can also be used as would be understood by one of ordinary skill in the art.

The connection between the mounting bracket 110 and the junction box 104 allows the frame 106 and the lamp assembly 108, once assembled, to be rotated together between 30 and 90 degrees relative to the junction box 104 about the first axis A1. The first axis A1 can be defined by the rotation of the frame 106, a point on the junction box 104, a point on the main plate 118, or by the intended direction of light emitter at a zero orientation. Other rotatable connections can also be used as would be understood by one of ordinary skill in the art.

When installed, the main plate 118 and the side flanges 120 of the mounting bracket 110 can extend into the frame 106. In certain embodiments, the main plate 118 of the mounting bracket 110 can be positioned past the frame 106 relative to the support surface 102. Aspects of these configurations allow for a lower profile light fixture 100.

Figure 6:
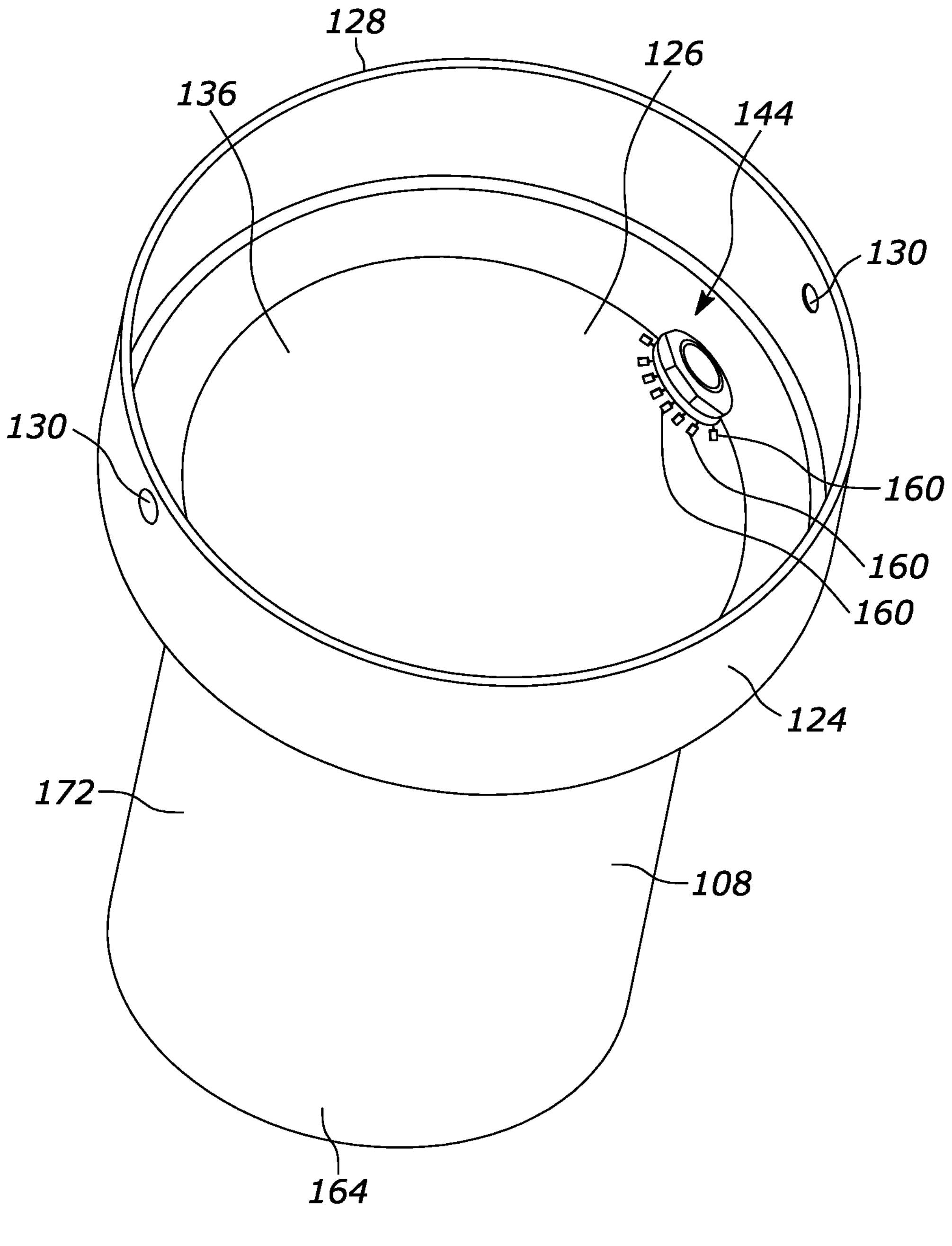
FIG. 6 is a perspective view of a lamp assembly, pivot, and frame of the light fixture of FIG. 1.

As best seen in FIGS. 3 and 6, the frame 106 includes an outer wall 124 that extends around an inner wall 126. The illustrated example shows a continuous, circumferential outer wall 124, although other configurations (i.e., sizes, shapes, designs, etc.) can be used. For example, the outer wall may have a square shape. The outer wall 124 includes an upper edge 128, for example a circumferential edge. The outer wall 124 can be configured so that that the upper edge 128 engages or is adjacent the support surface 102 when installed. The outer wall 124 includes openings 130 which align with openings 132 of the side flanges 120 to couple the frame 106 to the mounting bracket 110.

Figure 5:
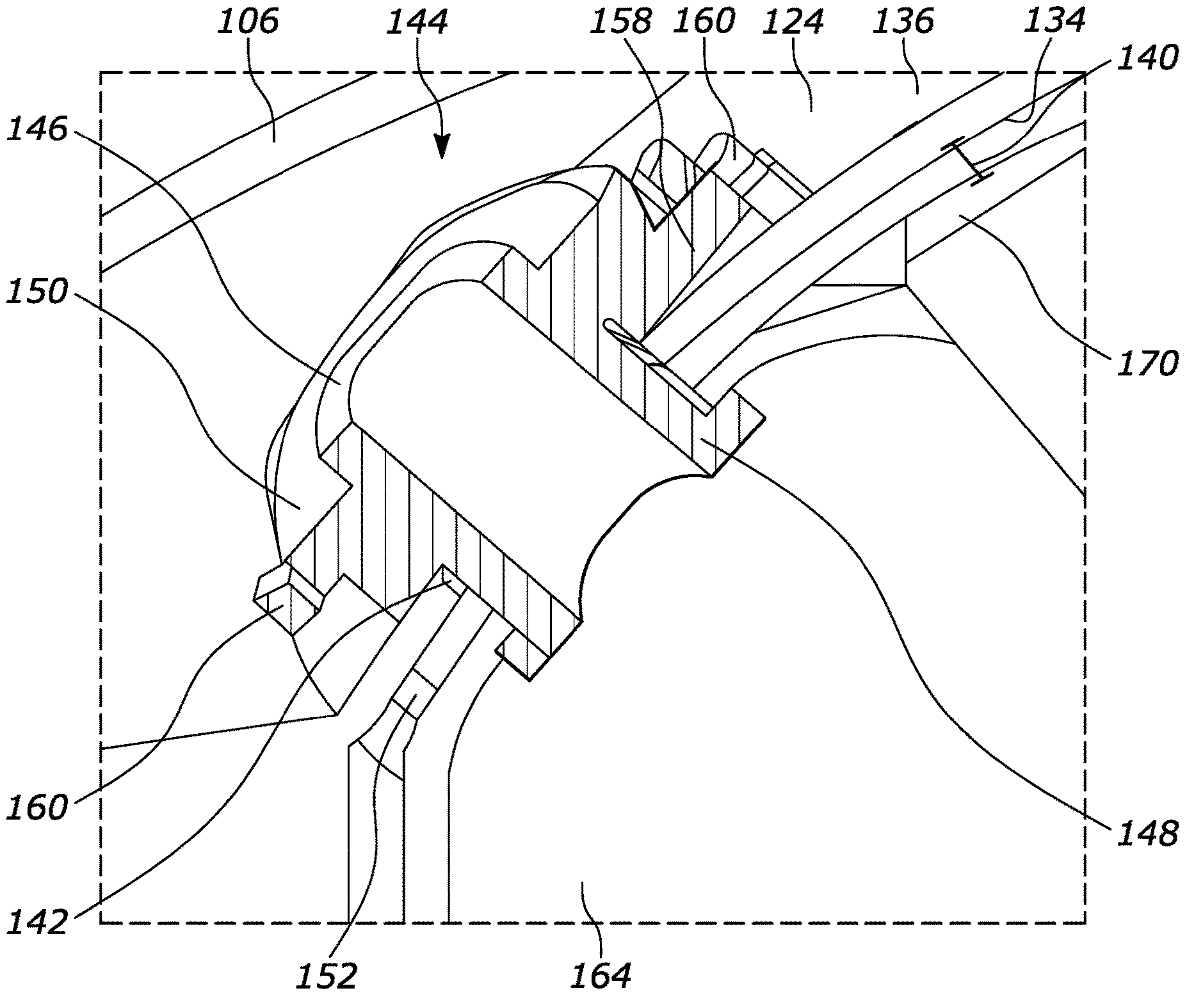
FIG. 5 is a partial perspective view of a cut of the light fixture of FIG. 1.

In certain configurations, the inner wall 126 can include a curved interior 134 and a curved exterior. The inner wall 126 defines an interior cavity for receiving the lamp assembly 108. The interior cavity can have a hemi-spherical shape to allow for adjustment of the lamp assembly 108, although other configurations can be used. FIG. 5 shows the lamp assembly 108 spaced by a gap 140 from the inner wall 126, although some configurations can include engagement where the curved interior 134 of the inner wall 126 acts as a bearing surface. Preferably, the gap 140 between the lamp assembly 108 and the inner wall 126 is minimized to allow for a lower profile light fixture 100.

As best shown in FIG. 5, an opening 142 can be provided in the inner wall 126. The opening 142 receives a pivot 144 that rotatably connects the lamp assembly 108 to the frame 106. In some embodiments, the pivot 144 is a fastener assembly that includes a hollow bolt 146 defining a passageway and having a head 148 positioned in the lamp assembly 108 and a nut 150 that is connected on the outside of the inner wall 126 (e.g. adjacent the curved exterior 136) as best shown in FIG. 5. The nut 150 fastens the bolt 146 in place and secures the lamp assembly 108 to the frame 106. In some embodiments, the pivot 144 includes a curved washer 152 positioned between the inner wall 126 and the lamp assembly 108 (e.g. adjacent the curved interior 134). The curved washer 152 may maintain the space between the lamp assembly 108 and the inner wall 126. The curvature of the curved washer 152 may be different than the curvature of the curved interior 134.

The lamp assembly 108 can rotate with the bolt 146, for example about a second axis A2 (shown in FIG. 3) that is defined by the pivot 144 and specifically by the bolt 146. In some embodiments, the lamp assembly 108 can rotate relative to the pivot 144. The second axis A2 is offset from the first axis A1. For example, the second axis A2 is positioned at an angle to the first axis A1. In the illustrated embodiment, the second axis A2 is offset from the first axis A1 by approximately 45 degrees. Other angles between 0 and 90 degrees can also be used, for example between approximately 15 and 75 degrees or between approximately 30 and 60 degrees.

Figure 4:
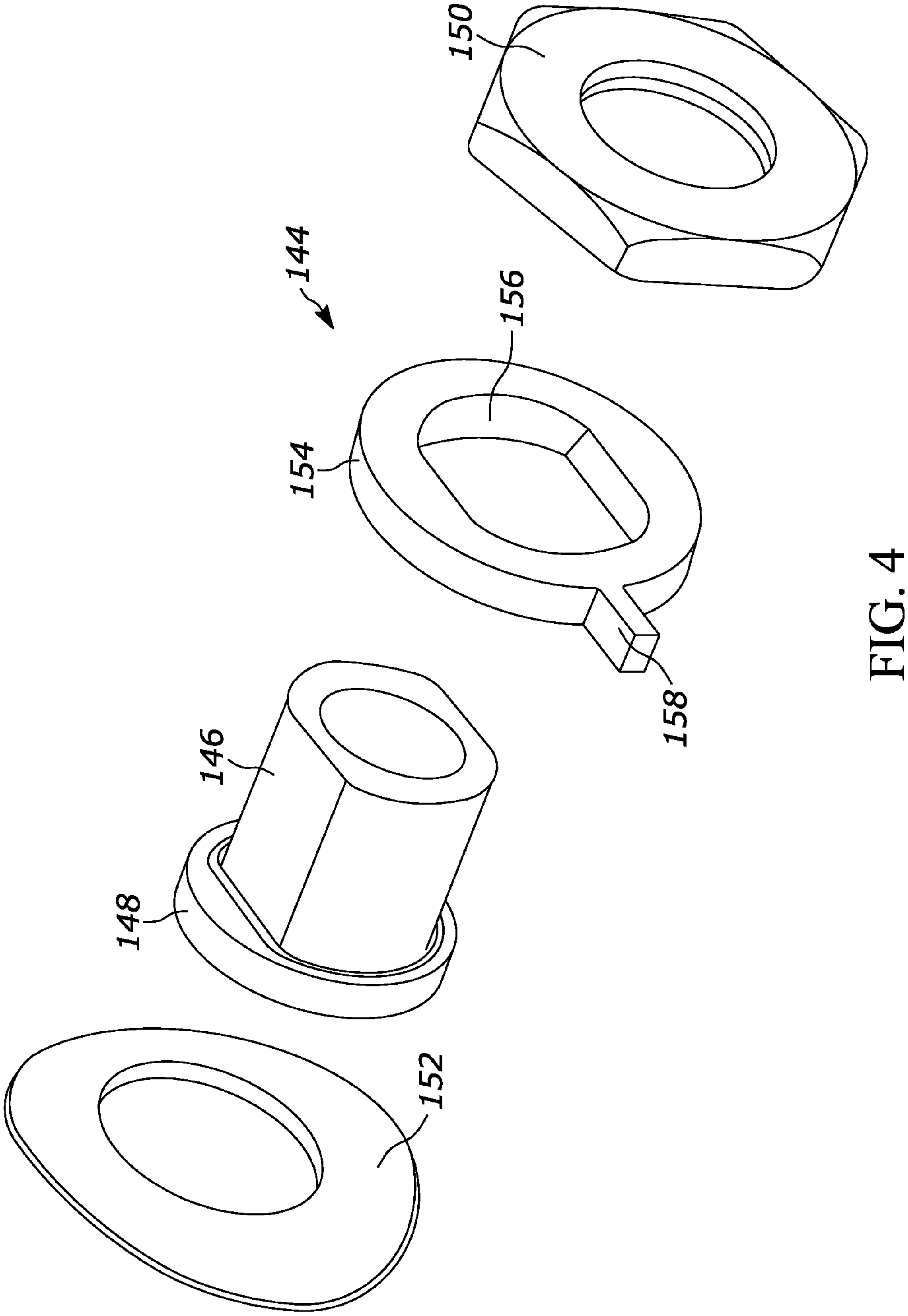
FIG. 4 is an exploded view of a pivot assembly of the light fixture of FIG. 1.

As best shown in FIGS. 4-5, an indicator 154 can be positioned on the pivot 144 that rotates with the lamp assembly 108. For example, the bolt 146 can include flattened side walls that are received by a complementary shaped opening 156 in the indicator 154 which acts as a keyed portion to key the indicator 154 to the bolt 146. The indicator 154 may include an engaging surface 158. In the illustrated embodiment the engaging surface 158 is formed as an arm extending radially from the indicator 154. A plurality of stops 160 can be formed on the curved exterior 136 of the inner wall 126 which contact the engaging surface 158 of the indicator 154 and thereby limit rotation of the indicator 154. The keyed connection between the indicator 154 and the bolt 146 also limits rotation of the bolt 146 and thus rotation of the lamp assembly 108. The stops 160 can be formed as projections (e.g., tabs) extending from the curved exterior 136 of the inner wall 126 of the frame 106. In some embodiments the stops 160 are positioned continuously around the opening 142 in the inner wall 126 and are evenly spaced about the second axis A2 by a stop angle θ1. In other embodiments the stops 160 may only extend partially around the opening 142. In some embodiments the stop angle θ1 may be about 5 degrees. Other stop angles between 0 and 360 degrees may be used such as approximately between 0 and 15 degrees. When assembled, the interaction of the indicator 154 with the stops 160 may limit rotation of the lamp assembly 108 relative to the second axis A2 to a range equal to the stop angle 1. Markings or other indicators (not shown) can be provided on the inner wall 126 to allow a user to accurately set the position of the indicator 154.

Figure 7:
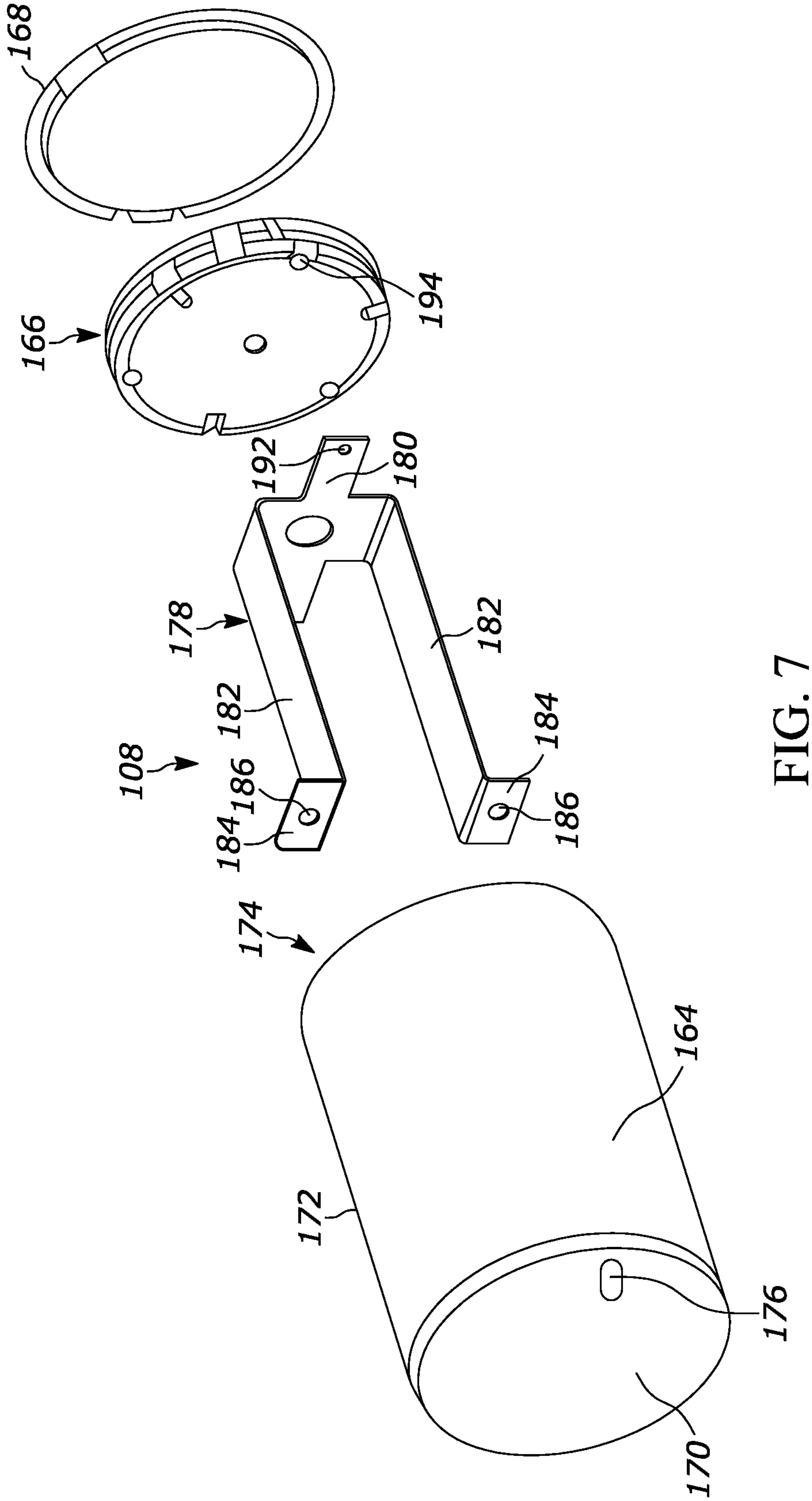
FIG. 7 is an exploded view of the lamp assembly of the light fixture of FIG. 1.
Figure 8:
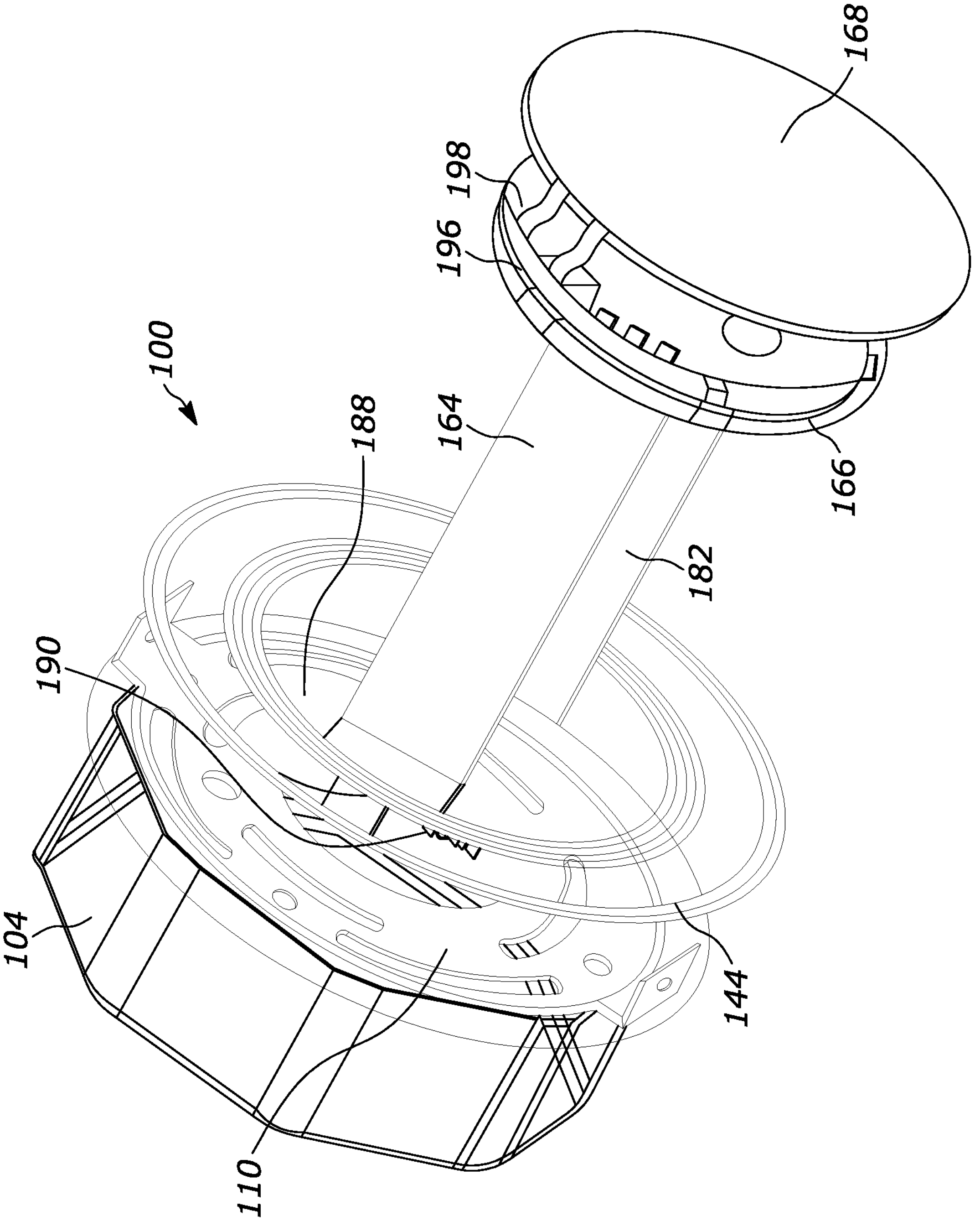
FIG. 8 is a perspective view of the light fixture of FIG. 1 with the frame and lamp housing transparent.
Figure 9A:
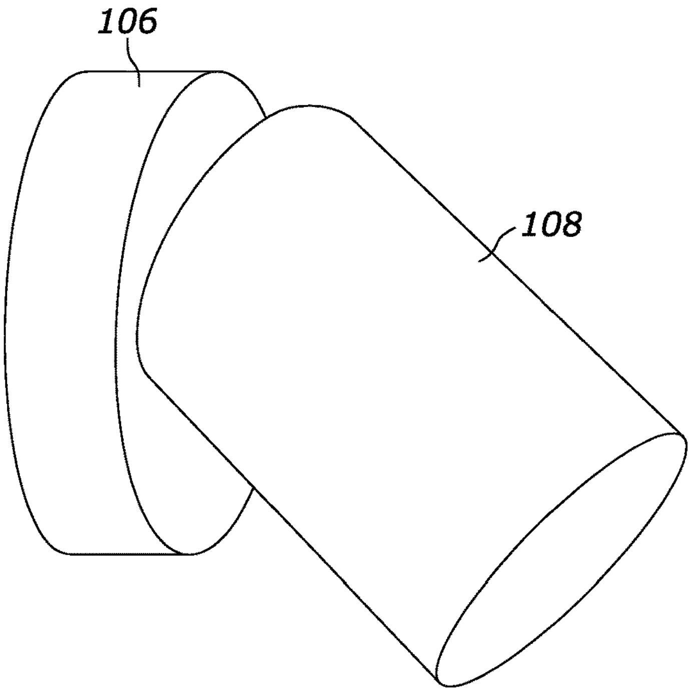
FIGS. 9A-9F are side views of the light fixture of FIG. 1 in a variety of use positions.
Figure 9B:
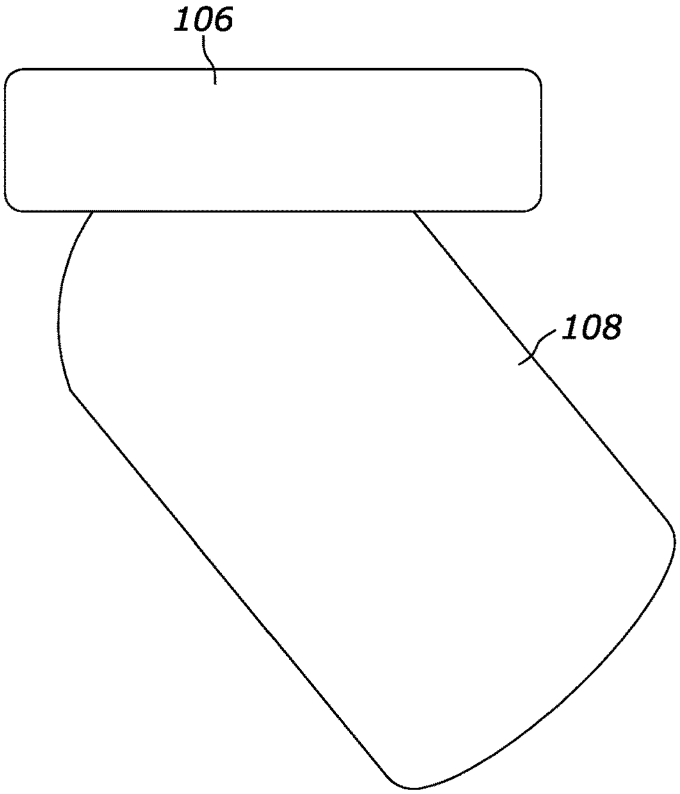
Figure 9C:
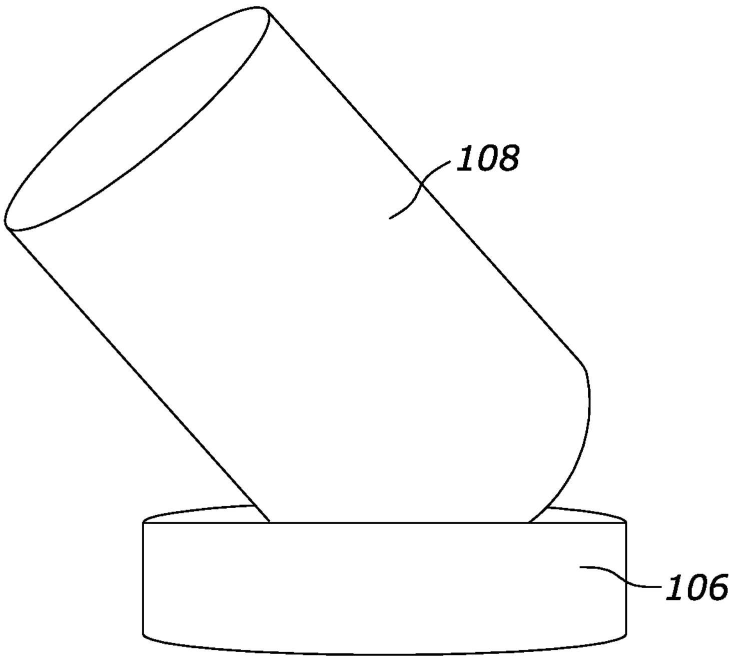
Figure 9D:
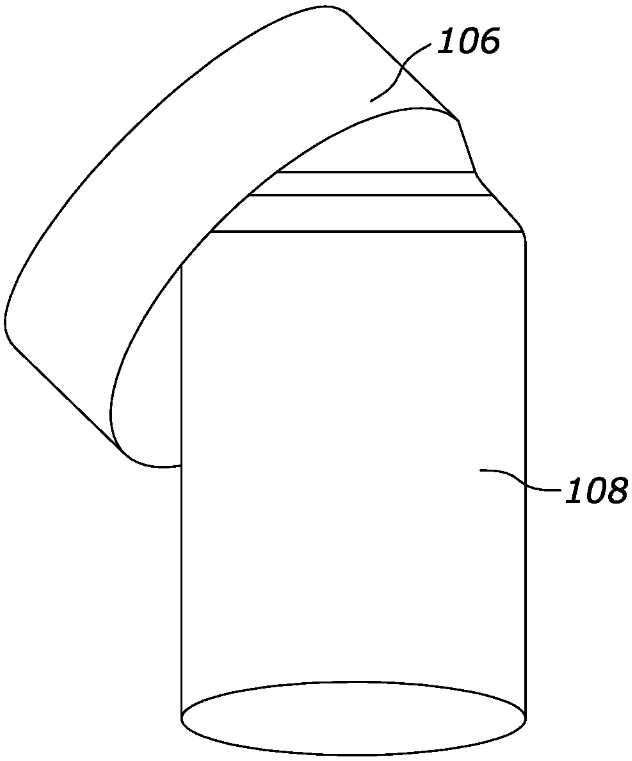
Figure 9E:
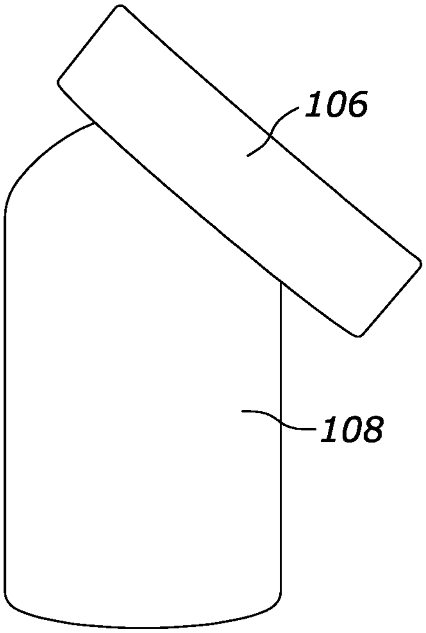
Figure 9F:
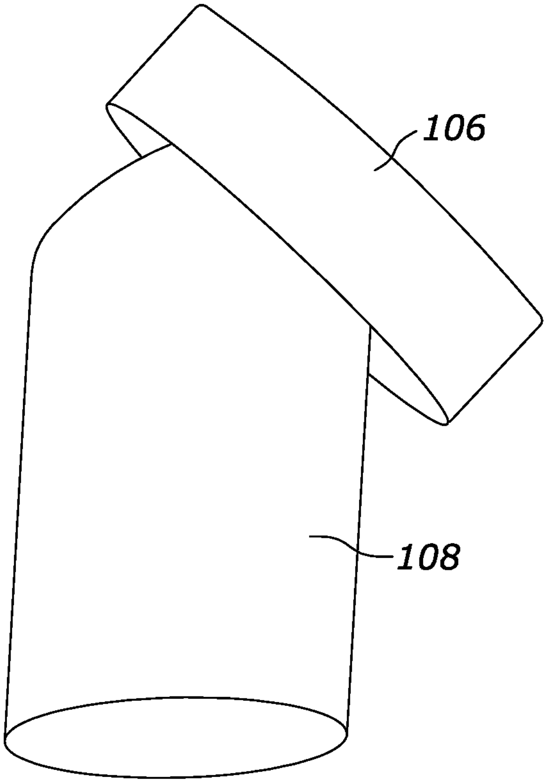

FIGS. 7-8 show an exemplary embodiment of the lamp assembly 108. The lamp assembly 108 includes a housing 164, a light emitter 166 positioned in the housing 164, and a lens 168 connected to the housing 164. The housing 164 has a substantially hemi-spherical upper surface 170, a sidewall 172, and a bottom opening 174. In the illustrated embodiment the sidewall 172 is a cylindrical sidewall, however, in other embodiments, other cross sections, such as a square cross section, may be used. An opening 176 is positioned on one side of the upper surface 170 for receiving the pivot 144. For example, the pivot bolt 146 can extend through the opening 176, with the head 148 of the bolt 146 positioned in the housing interior. In some embodiments, the sides of the opening 176 can be keyed to the pivot bolt 146, so that the housing 164 is rotatably fixed to the pivot bolt 146.

The light emitter 166 is mounted to the housing 164 by a mounting support 178. In some aspects, the mounting support 178 includes a U shaped body having a base plate 180 and a pair of legs 182 extending upwardly from the base plate 180. Each of the pair of legs 182 ends in a foot 184 having an opening 186. The housing 164 includes a body 188. In some embodiments, the body 188 acts as a heat sink to dissipate heat generated by the light emitter 166. The body 188 can include a screw boss 190 for receiving a fastener. The mounting support 178 may be positioned such that the openings 186 of the feet 184 align with the screw boss 190 which receives a fastener to connect the mounting support 178 to the housing 154. The base plate 180 includes a pair of openings 192 which may align with corresponding openings 194 on the light emitter 166. The openings 194 on the light emitter 166 receive fasteners to connect the light emitter 166 to the mounting support 178. Other methods of mounting the light emitter 166 in the housing 164 can be used as would be understood by one of ordinary skill in the art.

The light emitter 166 can include a PCB 196 and a plurality LEDs 198 connected to the PCB 196. The PCB 196 can also include one or more integrated circuit that acts as a driver (e.g. driver on board or DOB IC), so that the PCB 196 can be directly connected to an AC power supply without going through a separate driver. Other embodiments can utilize drivers positioned in the lamp assembly 108, frame 106, junction box 104, support surface 102, or other separate location, or can utilize driverless applications of light emitters. The pivot bolt 146 can include a hollow shaft so that one or more conductors can extend through the pivot assembly 144 and into the lamp assembly 108 housing 164 to be connected to the light emitter 166. Standard strand conductors can be used as well as different types of quick connectors (e.g., male/female plugs, threaded, etc.). The LEDs 198 are positioned in an array on the PCB 196 to emit light out of the opening in the housing 164 toward the lens 168. The lens 168 can include various optical features as required for the desired final light output. The lens 168 can be releasably connected to the housing 164 (e.g., threaded, snap-fit, etc.) so that different lens configurations can be utilized with a common housing 164.

FIGS. 9A-9F illustrate a variety of use positions of the light fixture 100. During installation, an opening can be made in a support surface 102, such as a sloped ceiling. The junction box 104 can be installed relative to the opening and one or more power supply conductors can be run into the junction box 104. The mounting bracket 110 can then be connected to the junction box 104 by coupling a fastener through the arcuate slots 122 and openings 116 on the flanges 114. The light fixture 100 can then be positioned near the junction box 104 and mounting bracket 110. An electrical connection can be made between the power supply conductors and the lamp assembly 108. For example, wires connected to the light emitter 166 can be spliced or a connector can be attached. The light fixture 100 can then be secured to the mounting bracket 110 by positioning a fastener through the opening 130 in the outer wall 124 and the opening 132 in the side flanges 120 of the mounting bracket 110. The lamp assembly 108 can then be rotated about the first axis A1 to a desired angle for a desired directional light output.

Figure 10:
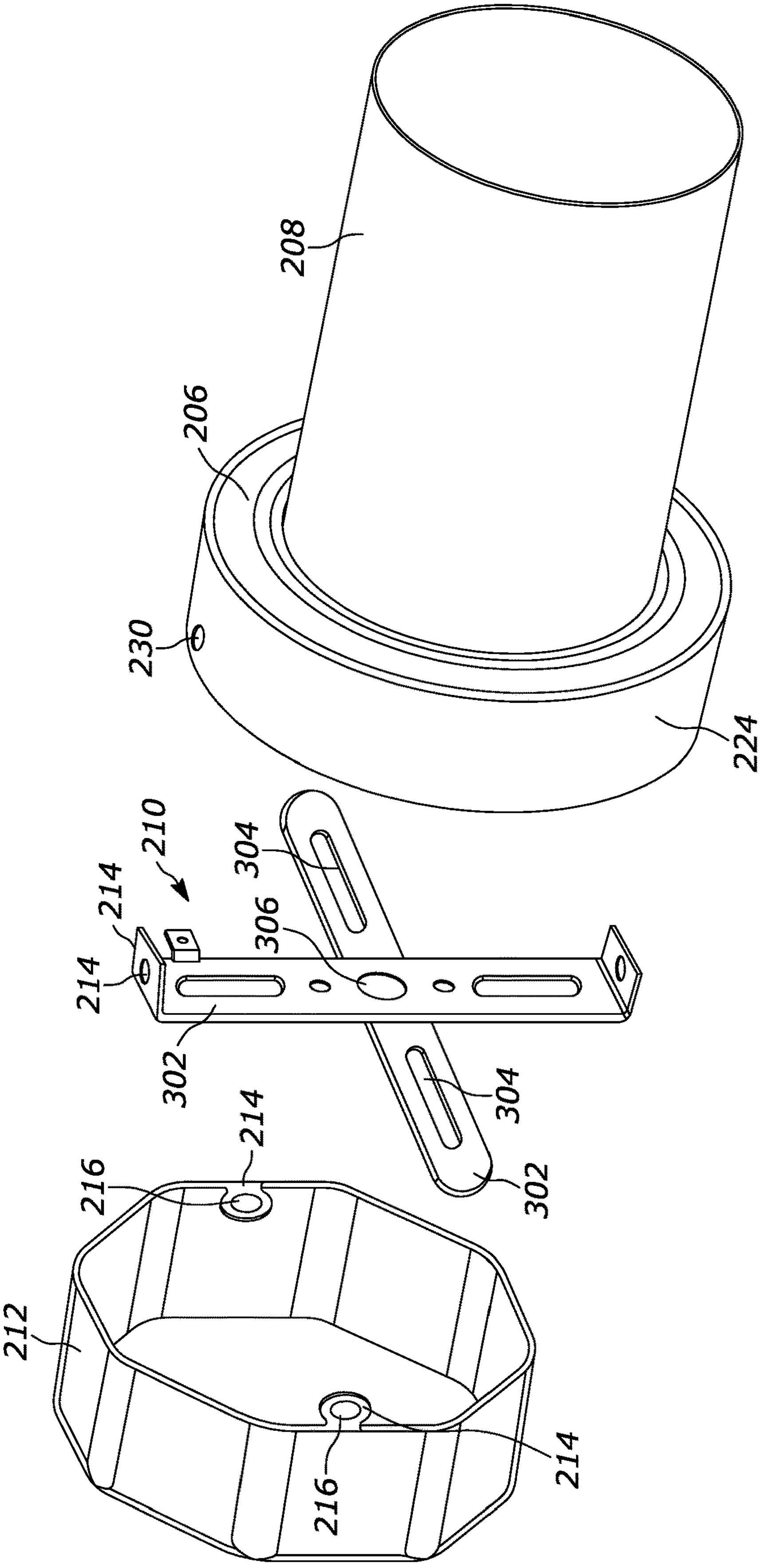
FIG. 10 is a partial exploded view of a light fixture including an alternate mounting bracket.

FIG. 10 shows another embodiment of an adjustable light fixture 200. The light fixture 200 shares a number of similar components with the light fixture 100 shown in FIGS. 1-8, with like reference numbers provided in the 200 series. The light fixture 200 includes a two-piece mounting bracket 210 having a first bar 300 and a second bar 302. The first bar 300 includes elongate slots 304 configured for connection to the openings 216 in the flanges 214 of the junction box 204. While in the illustrated embodiment the first bar 300 includes slots 304, in other embodiments the first bar 300 may include openings or apertures which align with the openings 216 of the junction box 204. The second bar 302 includes a pair of side flanges 214 including openings 216 for connecting with the openings 230 in the outer wall 224 of the frame 206. The first bar 300 and the second bar 302 are connected by a pivot connection 306. The pivot connection 306 allows the frame 206 and lamp assembly 208 to rotate 360 degrees about the first axis A1 even after installation. The two-piece mounting bracket 210 therefore allows for additional adjustability.

The foregoing detailed description of the certain exemplary embodiments has been provided for the purpose of explaining the general principles and practical application, thereby enabling others skilled in the art to understand the disclosure for various embodiments and with various modifications as are suited to the particular use contemplated. This description is not necessarily intended to be exhaustive or to limit the disclosure to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present disclosure, and are not intended to limit the structure of the exemplary embodiments of the present disclosure to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments. Unless specified or limited otherwise, the terms "mounted," "connected," "supported," and "coupled" and variations thereof are used broadly and encompass both direct and indirect mountings, connections, supports, and couplings.

What is claimed:

1. An adjustable light fixture comprising:

a frame configured to rotatably connect to a support and rotate about a first axis;

a lamp assembly connected to the frame, the lamp assembly including a housing defining a cavity, a light emitter supported in the cavity, and a lens connected to the housing; and a pivot assembly rotatably coupling the lamp assembly to the frame about a second axis offset from the first axis, wherein the pivot assembly includes a pivot bolt and the housing is keyed to the pivot bolt.

2. The adjustable light fixture of claim 1, wherein the pivot assembly includes an indicator and a spacer.

3. The adjustable light fixture of claim 2, wherein the indicator is keyed to the bolt.

4. The adjustable light fixture of claim 2, wherein the spacer is positioned between a curved upper surface of the housing of the lamp assembly and a curved lower surface of the frame.

5. The adjustable light fixture of claim 2, wherein the frame includes one or more stops configured to engage the indicator to limit rotation of the lamp assembly relative to the frame.

6. The adjustable light fixture of claim 1, wherein the frame is rotatably connected to the support by a mounting bracket.

7. The adjustable light fixture of claim 6, wherein the mounting bracket includes a first leg rotatably connected to a second leg.

8. The adjustable light fixture of claim 6, wherein the mounting bracket includes a first opening and a second opening oriented substantially perpendicularly with respect to the first opening, the first opening configured to receive a first fastener to secure the mounting bracket to the frame, and the second opening configured to receive a second fastener to permit rotational movement between the support and the mounting bracket.

9. The adjustable light fixture of claim 6, wherein the mounting bracket includes at least one slot that is configured to receive a fastener that extends through the at least one slot to connect the frame to the support, and wherein the mounting bracket configured to move about the fastener so that the fastener travels along the length of the at least one slot.

10. The adjustable light fixture of claim 1, wherein the pivot bolt includes at least one curved side and at least one flattened side.

11. An adjustable light fixture comprising:

a mounting bracket including a first connection point configured to connect to a support for rotation about a first axis;

a frame connected to a second connection point on the mounting bracket and rotatable with the mounting bracket about the first axis, wherein the second connection point is spaced apart from the first connection point;

a lamp assembly connected to the frame, the lamp assembly including a housing defining a cavity, a light emitter supported in the cavity, and a lens connected to the housing; and a pivot assembly rotatably coupling the lamp assembly to the frame about a second axis offset from the first axis.

12. The adjustable light fixture of claim 11, wherein the mounting bracket includes a first leg rotatably coupled to a second leg for rotation about the first axis.

13. The adjustable light fixture of claim 12, wherein the first leg is rotatable 360 degrees with respect to the second leg.

14. The adjustable light fixture of claim 12, wherein the first leg is fixed to the support and the second leg is fixed to the frame.

15. The adjustable light fixture of claim 11, wherein a pivot assembly rotatably connects the lamp assembly to the frame, and wherein the lamp is keyed to the pivot assembly.

16. The adjustable light fixture of claim 11, wherein the mounting member includes a main surface having an arcuate slot, wherein the support includes fasteners movably mounted in the arcuate slot, thereby rotatably coupling the support to the mounting member.

17. The adjustable light fixture of claim 11, wherein the first connection point is a first opening and the second connection point is a second opening that is oriented substantially perpendicularly with respect to the first opening, the first opening configured to receive a first fastener to permit rotational movement between the support and the mounting bracket, and the second opening configured to receive a second fastener to secure the mounting bracket to the frame.

18. An adjustable light fixture comprising:

a frame configured to be positioned adjacent an opening in a support, the opening defining a first axis extending through the opening;

a lamp assembly connected to the frame, the lamp assembly including a housing, a light emitter connected to the housing, and a lens connected to the housing; and a pivot assembly rotatably connecting the lamp assembly to the frame for rotation about a second axis offset from the first axis, the pivot assembly including an indicator rotationally secured to a pivot fastener.

19. The adjustable light fixture of claim 18, wherein the indicator includes a passageway with a noncircular shape which receives the pivot fastener to key the pivot fastener and the indicator, wherein the housing of the lamp assembly includes a corresponding non circular opening which receives the pivot fastener and keys the pivot fastener to the lamp assembly.

20. The adjustable light fixture of claim 19, further comprising one or more stops positioned on the frame which engages the indicator to limit rotation of the lamp assembly relative to the frame.

* * * * *